United States Patent [19]

Inada et al.

[11] Patent Number: 4,615,023
[45] Date of Patent: Sep. 30, 1986

[54] BEAM ACCESS APPARATUS FOR OPTICAL DISC SYSTEM

[75] Inventors: Hiroshi Inada; Tadashi Nomura; Shigeru Shimonou, all of Tokyo, Japan

[73] Assignee: NEC Corporation, Japan

[21] Appl. No.: 765,172

[22] Filed: Aug. 12, 1985

Related U.S. Application Data

[63] Continuation of Ser. No. 503,867, Jun. 13, 1983, abandoned.

[30] Foreign Application Priority Data

| Jun. 14, 1982 | [JP] | Japan | 57-101912 |
|---|---|---|---|
| Oct. 14, 1982 | [JP] | Japan | 57-180248 |
| Oct. 14, 1982 | [JP] | Japan | 57-180250 |
| Oct. 14, 1982 | [JP] | Japan | 57-180251 |
| Oct. 26, 1982 | [JP] | Japan | 57-187704 |
| Oct. 26, 1982 | [JP] | Japan | 57-187705 |

[51] Int. Cl.⁴ ............................................. G11B 21/10
[52] U.S. Cl. ............................... 369/32; 369/43; 369/44; 369/33; 250/202; 358/907
[58] Field of Search .................... 369/32, 30, 33, 43, 369/44; 250/202; 360/72.2, 78; 358/907

[56] References Cited

U.S. PATENT DOCUMENTS

| 4,135,083 | 1/1979 | Van Alem | 369/45 |
|---|---|---|---|
| 4,236,232 | 11/1980 | Jansen | 369/44 |
| 4,363,116 | 12/1982 | Kleuters | 369/30 |
| 4,562,562 | 12/1985 | Noviga | 369/44 |

Primary Examiner—Alan Faber
Attorney, Agent, or Firm—Ostrolenk, Faber, Gerb & Soffen

[57] ABSTRACT

A beam access apparatus for an optical disc system. The apparatus includes a lens position detector for generating a lens position signal indicating a position of the objective lens in a radial direction of the disc with respect to the optical head which is movable relative to the disc. The apparatus is operated in a head access mode in which the optical head is moved in the radial direction of the disc and the objective lens is caused to follow the movement of the optical head such that the objective lens is positioned at a predetermined location with respect to the optical head. The apparatus is also operable in a lens access mode wherein the objective lens is moved in the radial direction and the optical head is caused to follow the objective lens such that the objective lens is located at a predetermined position with respect to the optical head.

13 Claims, 5 Drawing Figures

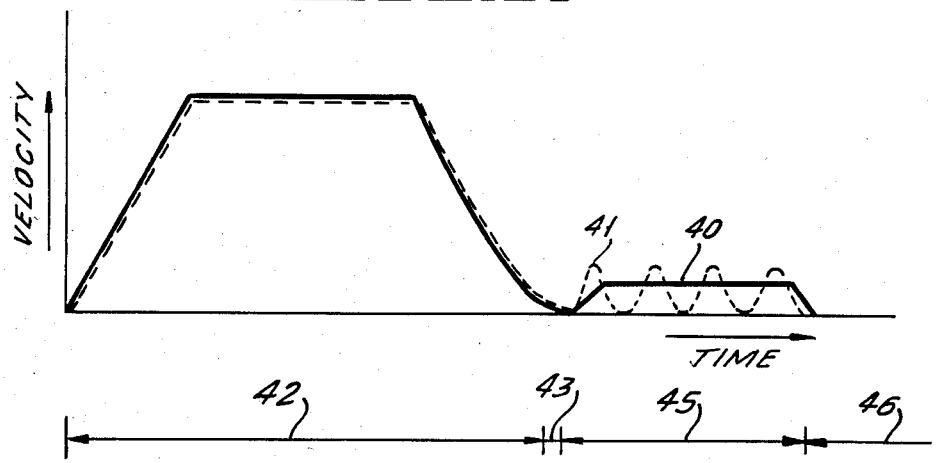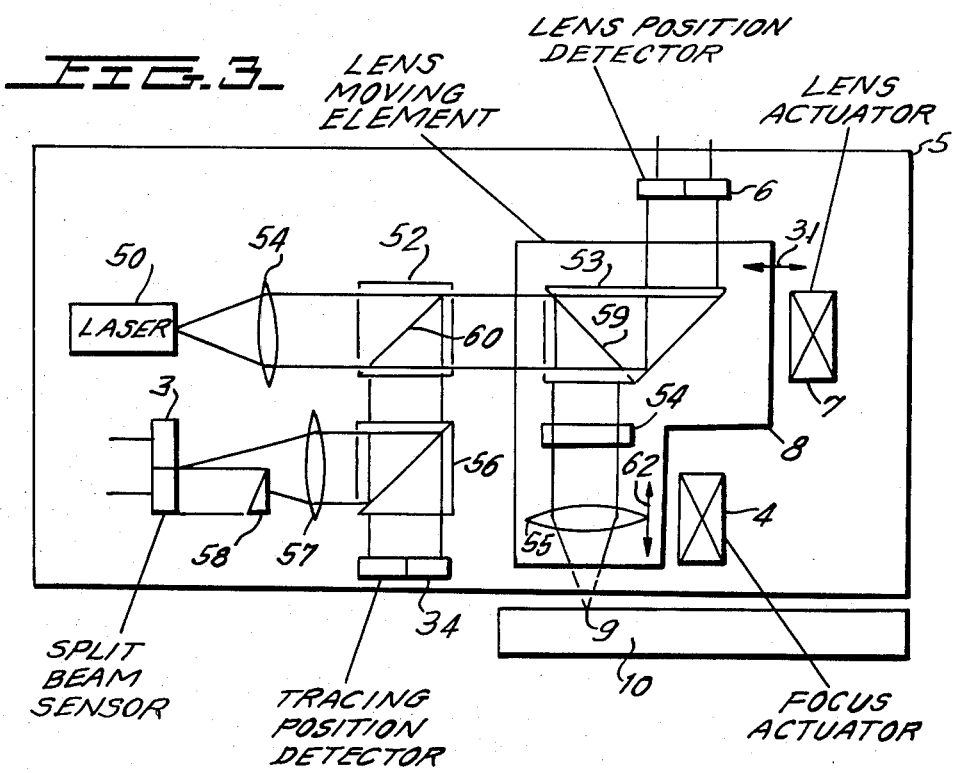

BEAM ACCESS APPARATUS FOR OPTICAL DISC SYSTEM

This is a continuation of U.S. application Ser. No. 503,867, filed June 13, 1983, now abandoned.

BACKGROUND OF THE INVENTION

The present invention relates to an optical disc system in which information is recorded on a recording medium or recorded information is reproduced therefrom, by using optical means, and more particularly to a beam access apparatus in such a system.

In an optical disc system in which a laser beam from a light source is modulated by a pulse signal from an external information source and is recorded in a binary manner onto a recording medium on the surface of a disc, or information already recorded is read out from the medium, guide grooves of the optimum width for the light spot and the optimum depth for the wavelength of the laser beam are usually provided on the recording medium, and tracking position control is conducted so that the minute light spot is positioned precisely on a guide groove. This condition is called the track-follow mode, in general, in which the positioning operation for the light spot is performed to make it follow accurately the guide groove (hereinafter called a track) on which the light spot is positioned, whereby the recording of information or the reproduction thereof is performed.

When information is to be recorded on or read from a track other than the track on which the light spot is positioned, the light spot must be moved to the target track. When moving the light spot between tracks separated by a long distance, it is usually transferred from the current track to the target track by using both a head access mode in which the whole of the optical head is first transferred in the radial direction of the disc by the head actuator to position the light spot roughly in the vicinity of the target track, and a lens access mode in which the objective lens in the optical head is then moved track by track in the radial direction of the disc by the lens actuator to position the spot on the target track by a repetition of the track-by-track transfer thereof. In those cases where the light spot must be moved for a short distance, the light spot is moved from the current track to the target track using the lens access mode alone. After the light spot is moved to the target track in this way, it is made to follow that track so that it is positioned thereon in the track follow mode described previously, and thus information is recorded on or read from the required track recorded information is reproduced therefrom.

In the head access mode, however, it is necessary to generate large accelerations and decelerations of the head actuator in order to move the optical head at high speed. When the optical head is moved at such a large acceleration and deceleration, the relative position of the objective lens in the optical head is displaced to a large degree by the acceleration and deceleration, since the objective lens is usually coupled to the head by a spring or the like. In particular, damped vibrations of the objective lens are induced in the tracking direction thereof by deceleration after the optical head is positioned roughly, and thereby damped vibrations of the light spot are also induced in the tracking direction. When damped vibrations occur in this way, it is impossible to position the light spot accurately until damped vibrations are reduced to some extent, and thus the positioning of the light spot on the required track takes long time. Moreover, the large displacement of the objective lens due to this acceleration and deceleration has an adverse effect on the optical system, and thereby accurate focusing control is probably impossible.

In the track-follow mode and the lens access mode, the optical head is positioned by the head actuator in response to an optical head position signal obtained by a position detector provided externally, and the light spot is positioned in response to a signal indicating the relative positions of the light spot and the tracking guide groove, by a tracking actuator driving the objective lens in the optical head. Since the optical head and the objective lens (and with it the light spot), are positioned separately, the positioning information on the objective lens does not influence the positioning of the optical head. As a result, any eccentricity in the tracking guide groove or shift in the position of the objective lens in the optical head due to the track jumping, for instance, causes distortion of a spring supporting the objective lens, and the spring force which is proportional to the distortion has adverse effects, as interference, on the tracking control system. Concretely, a lack of stability in the track jumping of objective lens (the light spot), and an increase in the positional offset in tracking control, etc., can be included as adverse effects. In extreme cases, the target track can not be reached, since a relatively large distance track-jump is impossible, and the increase in the positional offset reduces the reliability of the reproduction of recorded information.

Furthermore, in an optical head in which tracking control is conducted by moving the objective lens alone in the tracking direction, the movement of the objective lens causes the optical axis of the light reflected from the recording medium to shift relative to that of the incident light, causing a shift of the optical axis to a track position error detector. Thereby an offset is caused in the detection of errors in the position of the track, the accuracy of positioning in the tracking is reduced, and the reliability of the reproduction of recorded information is also reduced.

BRIEF DESCRIPTION OF THE INVENTION

It is, therefore, an object of the present invention to provide a beam access apparatus for an optical disc system capable of accessing an optical head at a high speed with suppressing damping vibrations.

According to the present invention, there is provided a beam access apparatus for an optical disc system in which a position of an objective lens in a tracking direction is detected with respect to an optical base in an optical head. In a head access mode, the objective lens is positioned and fixed at a prescribed position relative to the optical head to suppress damping vibrations and the optical head is moved at a high speed. In a lens access mode and a track follow mode which are subsequent to the head access mode, control over the positioning of the optical head is performed so that the objective lens is positioned at a prescribed position relative to the optical head to enable a precise following of a track by a light spot and a stable track jumping of the light spot by driving the objective lens.

BRIEF DESCRIPTION OF THE DRAWINGS

Other features and advantages of the present invention will be apparent from the following description of a preferred embodiment of the present invention taken in conjunction with the accompanying drawings, wherein:

FIG. 2 is a graph illustrating an operation of the embodiment shown in FIG. 1; and FIGS. 3, 4 and 5 show examples of the optical head used in the embodiment shown in FIG. 1.

DETAILED DESCRIPTION OF THE PREFERRED EMBODIMENT

Figure 1:
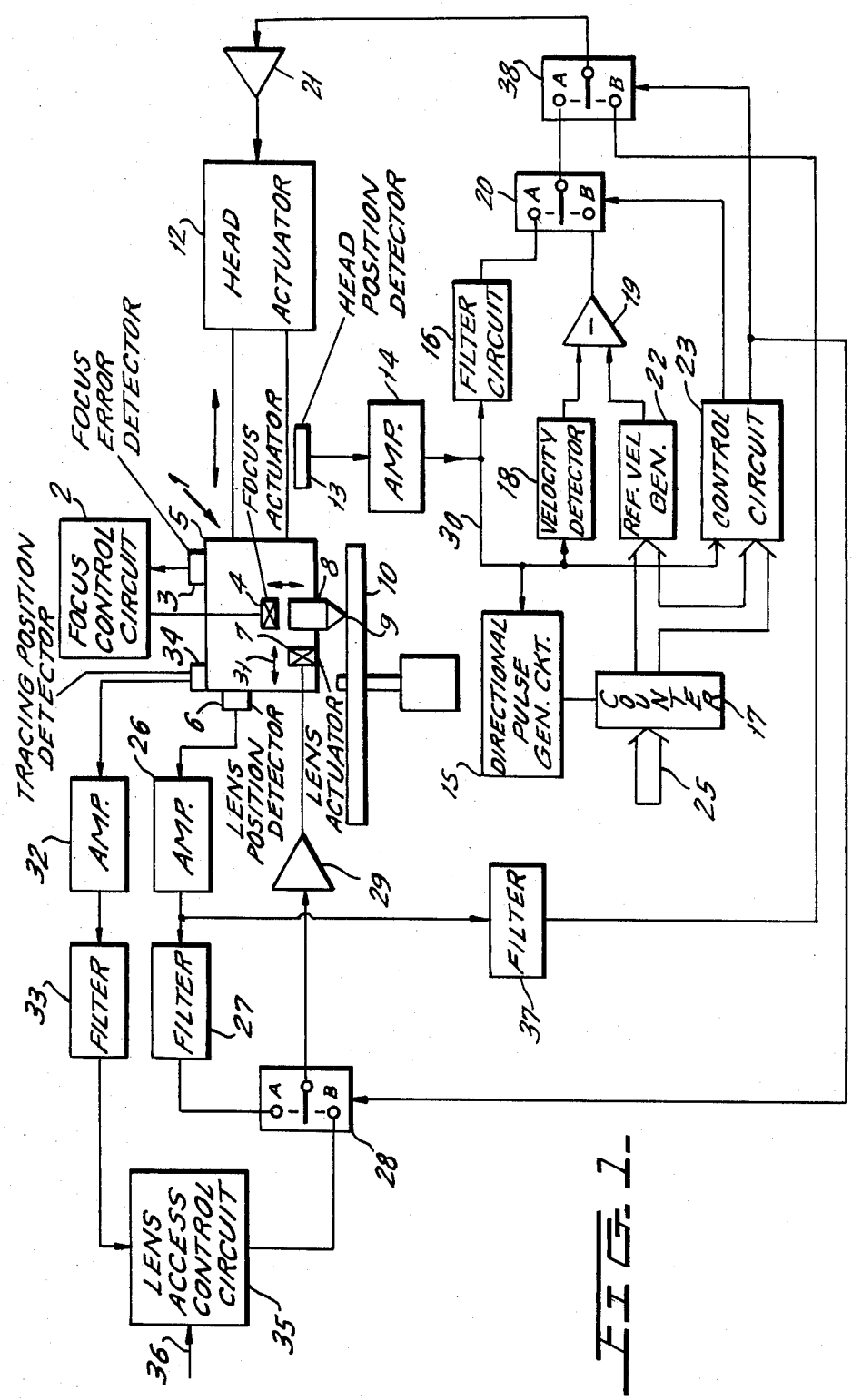
FIG. 1 is a block diagram of an embodiment of the present invention.

Referring to FIG. 1, which illustrates a beam access apparatus according to an embodiment of the present invention, a stroke signal 25 indicates a desired movement stroke of an optical head 1 (i.e. the distance from its present position to its desired position) is preset in a counter 17 from an external control circuit (not shown). An output from the counter 17 is applied to a reference velocity generating circuit 22 and a control circuit 23. The control circuit 23 also receives a head position signal 30, and delivers a signal for placing switches 28 and 38 in position A until a prescribed period of time has lapsed after both the counter output, and the head position signal 30 have become zero, that is, until a prescribed period of time has lapsed after the optical head 1 reaches a target position. Thus, the switches 28 and 38 are initally connected in position A. A lens position signal is generated by a lens position detector 6 and shows the tracking direction, indicated by an arrow 31, of a lens-moving element 8 relative to an optical base 5 in the optical head 1. This signal is fed back to a lens actuator 7 via an amplifier circuit 26, a filter circuit 27, the switch 28 and a power amplifier 29. This feedback circuit causes the lens-moving element 8 to be positioned and fixed relative to optical base at a position at which the lens position signal is zero.

An output of a switch 20 is connected by the switch 38 to a power amplifier 21. At the same time, the position of the lens-moving element 8 in the focusing direction is detected by a focus error detector 3 and is fed back to a focus actuator 4 via a focus control circuit 2 to keep the position of the focus of the objective lens (see FIGS. 3-5) on the recording surface of a disc 10.

The control circuit 23 delivers a signal for moving the switch 20 to position B until the output of the counter 17 becomes zero and the head position signal 30 falls below a prescribed value, i.e. until the optical head 1 reaches a position a prescribed distance in front of the required position. The reference velocity signal generated by the reference velocity signal generating circuit 22 corresponds to the output of the counter 17 and is applied to the power amplifier 21 via a differential amplifier 19 and the switch 20, and a head actuator 12 is driven by this reference velocity signal. When the head actuator 12 is driven in this way, the optical head 1 connected mechanically to the head actuator 12 is also driven so that it starts to move to the target position. At the same, the motion of the optical head 1 is detected by a head position detector 13 which generates a head position signal indicative thereof, and the signal is applied to velocity detector 18. The velocity detector 18 detects the velocity of the optical head 1 as a function of the head position signal 30, and feeds back the head velocity signal thus obtained to the differential amplifier 19. The differential amplifier generates a head movement signal as a function of the head velocity and reference velocity signals and applies this signal to the amplifier 21 to drive the head actuator 12. The velocity of the optical head 1 is controlled in this way so that it moves at the velocity specified by the reference velocity signal.

The head position signal is also applied to a directional pulse generating circuit 15, in which a directional pulse indicating the direction of movement of the optical head 1 is generated every time it moves by a prescribed distance. This directional pulse is fed back to the counter 17 to be subtracted from the preset stroke signal, with the result that the reference velocity signal generated by the reference velocity generating circuit 22 is also decremented as the optical head 1 approaches the target position. Thus, the optical head 1 is accelerated first at a large acceleration, and when the velocity thereof reaches the reference velocity it is controlled so that it matches the reference velocity therefor. The deceleration from the reference velocity to the target position is usually set, on occasion, to be of the same order of magnitude as the acceleration so as to realize high-speed track access. However, since the lens-moving element 8 containing the objective lens is positioned and fixed at a position (relative to optical base 5) at which the output of the lens position detector 6 is zero, the lens-moving element 8 hardly moves at all (relative to optical base 5) even under the large acceleration and deceleration applied for controlling the velocity of the optical head 1, and thus errors in the positioning of a lens can be made very small.

When the optical head 1 reaches a position a prescribed distance in front of the target position under velocity control (described above), the control circuit 23 delivers a signal for moving the switch 20 to position A. In this position, a position signal for the optical head 1, detected by the head position detector 13, is applied to the power amplifier 21 via an amplifier 14, a filter circuit 16 for phase compensation, and the switch 20 to drive the head actuator 12, and the position of the optical head 1 is controlled so that the position signal becomes zero, thereby the optical head 1 is positioned at the target position. The position of the lens-moving element 8 is hardly varied when the optical head 1 is positioned at the target position by the large deceleration, since the lens-moving element 8 containing the objective lens is positioned and fixed at a position on which the output of the lens position detector 6 is zero, in the same way as under velocity control. Accordingly, damped vibrations of the lens-moving element 8 due to shifts in the position thereof do not occur, and the access time can be reduced by the time required for settling such vibrations. In addition, the adverse effect on the optical system due to large displacement of the objective lens in the optical head can also be prevented.

After the optical head 1 is positioned at the target position in this way, the control circuit 23 supplies a signal for moving the switches 28 and 38 to position B. An error signal in the tracking position of the light spot 9 (the position of the light spot 9 is controlled by the position of the objective lens 55 of FIGS. 3-5 and the two will be referred to interchangeably herein) with respect to the track, which is detected by a tracking position detector 34, is applied to a power amplifier 29 via an amplifier circuit 32, a filter circuit 33 for compensating a phase, a lens access control circuit 35, and the switch 28. Thereby the lens actuator 7 is driven to position the lens-moving element 8 so that the light spot 9 is positioned on the nearest track.

The switch 38 acts to apply a lens position signal detected by the lens position detector 6 to a power amplifier 21 via an amplifier 26 and a filter 37 for phase compensation to control the optical head 1 so that it is positioned at the position on which the lens position signal is zero, via the head actuator 12. This has the effect of maintaining a predetermined positional relationship between the optical base 5 and the lens-moving element (and, therefore, the ojective lens 55). In this means, the position of the optical head 1 follows the position of the objective lens 55 and the light spot 9 is positioned accurately on the track. Since the optical head 1 is controlled so that it is positioned at the position on which the lens position signal is nearly zero, i.e. at the central position within the range over which the lens-moving element 8 can move for tracking the optical head 1 can follow relatively low frequency fluctuations in the position of the track, which are caused by the eccentricity of the disc 10, making it possible to position the lens-moving element 8 constantly at the central position within the range over which the element can move for tracking. Therefore, the lens-moving element 8 is not affected by supporting springs even when the eccentricity of the disc 10 is large, and thus the accuracy in positioning the light spot 9 on the track can be improved to a large extent.

When the light spot 9 is positioned on the nearest track, the address of the track at which the light spot is currently positioned is read out by an information reproducing circuit (not shown). Generally, the light spot is not moved from its present position to its target position by a single movement of the optical head 1. Accordingly, the light spot is moved a number of times equivalent to the number of tracks which is the difference between the address of the target track and that of the track on which the spot is currently positioned. This transfer is normally performed by repeating a track jump in which a movement is made over one track. When a track jump is performed, a track jump instruction 36 is applied to a lens access control circuit 35 from an external source, and, based on this instruction, the lens access control circuit 35 moves the lens-moving element 8 by one track, via the switch 28, the power amplifier 29 and the lens actuator 7 to make the light spot 9 jump by one track, thus positioning the light spot 9 on an adjacent track. The light spot 9 can be positioned on the target track by repeating this track jump. Since the optical head 1 also follows the motion of the lens-moving element 8 based on the lens position signal at the same time, the lens-moving element 8 is positioned constantly at the center of the supporting springs even when the track jump is repeated many times, so that the track jumping can be performed in a stable manner. At the same time, the lens-moving element 8 is positioned at the center of the supporting springs even after the light spot is positioned on the required track. Therefore, the light spot can follow the required track precisely, unaffected by any eccentricity in the track.

The high-speed access of the optical head 1 is performed, as described above, so that the lens-moving element 8 is positioned and fixed at the central position of the supporting springs by a lens position signal. Therefore, vibrations of the lens-moving element 8 can be suppressed, and thereby the time for access can be reduced. Moreover, by making the optical head 1 follow the motion of the lens-moving element 8 based on the lens position signal, track jumps can be conducted many times in a stable manner, while the track can be followed precisely even if there is eccentricity in the disc.

FIG. 2 is a graph showing the velocities of the optical head and the objective lens in the beam access apparatus shown in FIG. 1. In the figure, a solid line 40 represents the velocity of the optical head 1 and a broken line 41 represents the velocity of the objective lens. The region indicated by an arrow 42 is a velocity control region in the head access mode. In this region, the velocity control is performed so that the velocity of the optical head follows the reference velocity. Since the objective lens is positioned and fixed in the optical head relative to the optical base 5 during this time, the position thereof is not shifted much even by the acceleration and deceleration applied resulting from movement in the velocity control region, and it follows fairly faithfully the velocity of the optical head as shown by the broken line 41. When the optical head approaches the target position as detected by a head position detector, positional control is performed in the region indicated by an arrow 43 so that the optical head is positioned at the target position. In a subsequent region 44, the light spot the objective lens is positioned onto the nearest track, while the optical head enters up, based on the lens position signal, a track-follow mode in which it follows up the motion of the objective lens. Thus, the address of the track at which the light spot is positioned currently is read out, the difference from the address of the target track is obtained, the track jump operation is repeated a number of times equal to the number of tracks remaining between the current address and the target address in a region 45 using the lens access mode, and thereby the light spot is positioned on the target track. In this lens access mode, the objective lens repeats intermittent motions to advance toward the target track, while the optical head follows the position of the objective lens. Accordingly, the objective lens is constantly positioned almost at the center of the supporting springs, and thus it can repeat a stable track jump constantly. After the light spot is positioned on the required track in this way, accurate following of the track is carried out in the track-follow mode (in a region 46).

FIG. 3 illustrates a first example of the optical head 1. As shown therein, a laser beam emitted from a semiconductor laser 50 falls onto a beam splitter 53 through a collimating lens 51 and a polarized beam splitter 52, and is split into two by the refelection plane 59 of the splitter. One of the two split beams, which is reflected perpendicularly by the reflection plane 59, passes through a quarter-wave plate 54 and an objective lens 55 and is condensed into a light spot 9 on the surface of the recording medium of the disc 10 to record information or read it out. At the same time, a beam reflected from the recording medium falls on the beam splitter 53 through the objective lens 55 and the quarter-wave plate 54 and is reflected by the reflection plane 59. The beam thus reflected falls onto a polarized beam splitter 52 and is separated from the incident beam from the semiconductor laser 50 by a reflection plane 60. The reflected beam thus separated from the incident beam falls onto a half mirror 56 and is thereby further split into two. One of these split beams passes through a convex lens 57 and past a knife edge 58 and falls on a split-in-two beam sensor 3, whereby any focus error is detected. This method for detecting the focus error is well known as the knife edge method, in which a focus actuator 4 is driven by a focus error signal obtained thereby to position only the objective lens 55 in the lens-moving element 8 in the direction shown by an arrow 62.

The other reflected beam of the two which are split by the half mirror 56 falls onto a tracking position detector 34, which detects any error in the tracking position of the light spot 9 to the tracking guide groove provided on the surface of the disc 10. This method of detecting the tracking position is well known as the push-pull method, in which a tracking position error signal thus obtained is fed back to the lens actuator 7 to drive the lens-moving element 8 in the direction shown by an arrow 31 so that the light spot 9 is positioned at the center of the tracking guide groove. The beam splitter 53, quarter-wave plate 54 and objective lens 55 are fixed onto the lens-moving element 8 in the direction shown by the arrow 31. Therefore, by moving the lens-moving element 8 in the direction of the arrow 31 (in the radial direction of the disc), the objective lens 55 is also moved in the same direction, and thereby the light spot 9 can be moved in the direction of the arrow 31.

One of the incident beams emitted from the semiconductor laser 50 and transmitted by the beam splitter 53 is reflected perpendicularly and falls onto the lens position detector 6. Thus, the respective quantities of light falling on the two optical sensors in the lens position detector are different from each other according to the position of the beam splitter 53 to the direction of the arrow 31, and accordingly a signal proportional to the position of the beam splitter 53, i.e. the position of the objective lens 55, can be obtained. In other words, the position of the objective lens 55 in the direction of the arrow 31, in relation to the optical base 5, can be detected.

Figure 4:
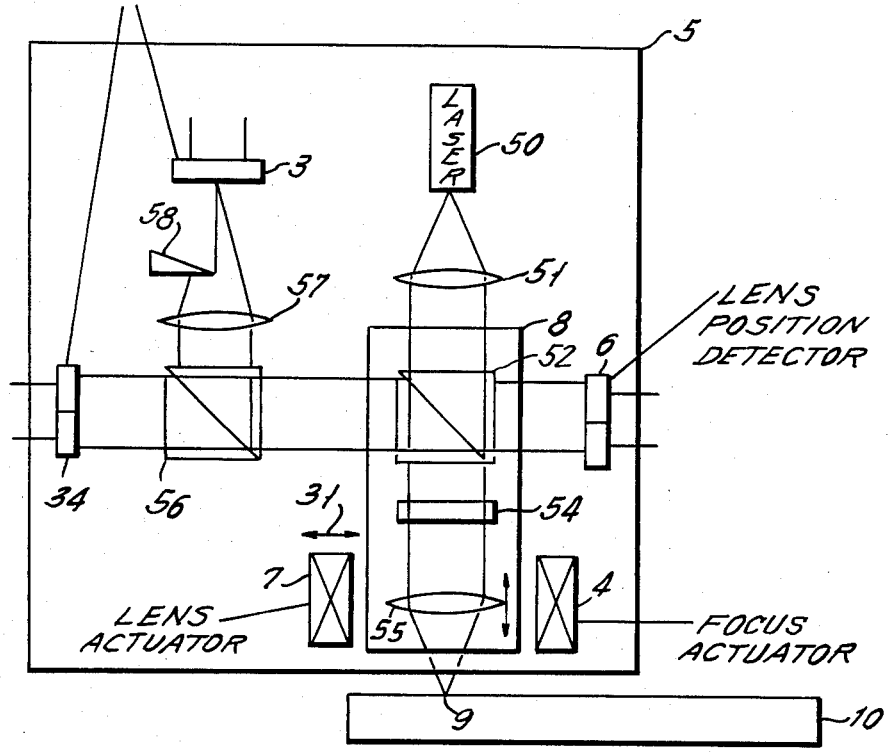

FIG. 4 illustrates a second example of the optical head 1. As shown therein, a laser beam emitted from a semiconductor laser 50 passes through a collimating lens 51, a polarized beam splitter 52, a quarter-wave plate 54 and a objective lens 55 and is condensed into a light spot 9 on the surface of the recording medium of the disc 10 so as to perform a recording or reading-out of information. On the other hand, a beam reflected from the recording medium passes through the objective lens 55 and the quarter-wave plate 54, is separated from the incident beam at the reflection plane of the polarized beam splitter 52, and falls onto a half mirror 56. The beam is split into two by the half mirror 56, one beam is made to fall onto a split-in-two beam sensor 3 through a convex lens 57 and past a knife edge 58, and any focal error is detected by the sensor. This method of detecting the focal error is the same knife edge method as that explained in connection with the first example of FIG. 3.

The other reflected beam split by the half mirror 56 is made to fall onto a split-in-two beam sensor 34, whereby any error in tracking position is detected. This method of detecting the error in tracking position is the same push-pull method as that explained in connection with the first example of FIG. 3. A tracking position error signal thus obtained is fed back to a lens actuator 7, whereby a lens-moving element 8 is driven in the direction of the arrow 31 so that the light spot 9 is positioned at the center of the tracking guide groove. The polarized beam splitter 52, the quarter-wave plate 54 and the objective lens 55 are fixed onto the lens-moving element in the direction of the arrow 31. Therefore, when the lens-moving element 8 is moved in the direction of the arrow 31, the polarized beam splitter 52, the quarter-wave plate 54 and the objective lens 55 are also moved in the same direction, and thus the light spot 9 can be moved in the direction of the arrow 31. During this time, the beam emitted from the semiconductor laser 50 and falling on the polarized beam splitter 52 is reflected slightly thereby, since the polarization of the beam is not a completely linear polarization and since the degree of splitting of the polarized beam splitter 52 is not ideal. This reflected beam is made to fall onto a split-in-two beam sensor 6, and, by differentiating two outputs of the two optical sensors, the position, of the lens-moving element, i.e. that of the objective lens 55, in the direction of the arrow 31, in relation to the optical base 5, can be detected. The second example of the optical head shown in FIG. 4 has a simpler optical system than that of the first example shown in FIG. 3.

Figure 5:
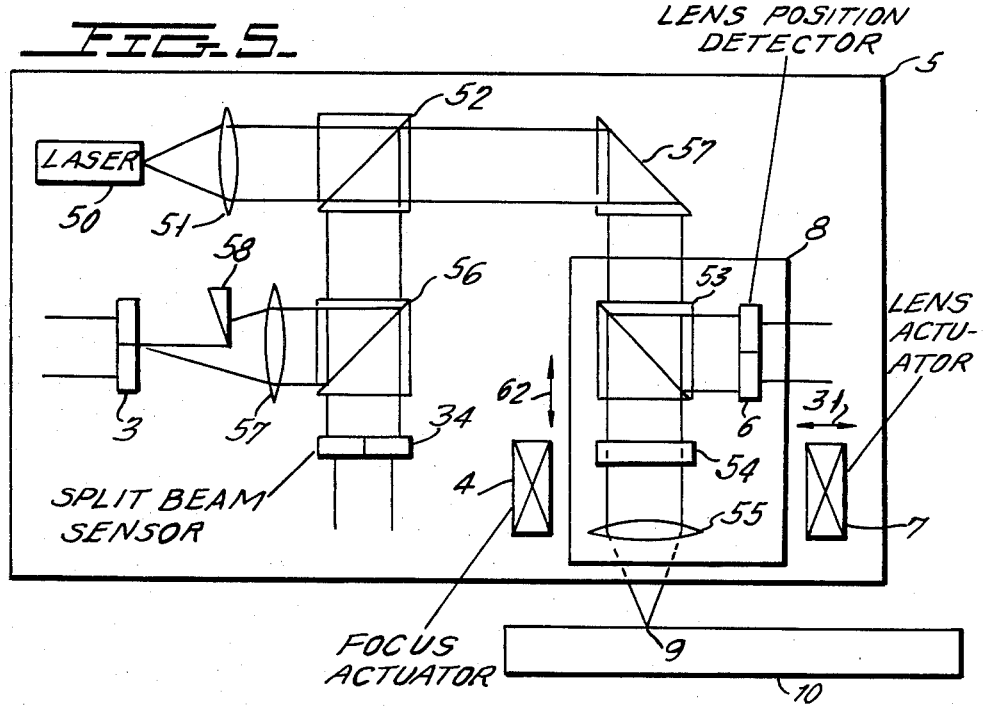

FIG. 5 illustrates a third example of the optical head 1. As shown therein, a laser beam emitted from a semiconductor laser 50 passes through a collimating lens 51, a polarized beam splitter 52, a right-angle prism 57, a beam splitter 53, a quarter-wave plate 54 and a objective lens 55 and is condensed into a light spot 9 on the surface of the recording medium on the disc 10, and thereby the recording or reading-out of information is conducted. A beam reflected from the recording medium passes through the objective lens 55, the quarter-wave plate 54, the beam splitter 53 and the right-angle prism 57 and is separated from the incident beam by the reflection plane of the polarized beam splitter 52, falling on a half mirror 56. The beam is split into two by the half mirror 56, one of the split beams is made to fall onto a split-in-two beam sensor 3 through a convex lens 57 and past a knife edge 58. Any focus error is detected by the sensor 3. This method of detecting focal error is the same knife edge method as that explained with respect to FIGS. 3 and 4. A focus error signal thus obtained is fed back to a focus actuator 4 via a focus control circuit to drive the lens-moving element 8 in the direction of an arrow 62. Since the beam splitter 63, the quarter-wave plate 54, the condenser 55 and the split-in-two beam sensor 6 are fixed onto the lens-moving element 8, the focus of the objective lens 55 can be positioned constantly on the surface of the recording medium by controlling the lens-moving element 8 so that it is positioned in the direction shown by the arrow 62.

The other reflected beam split by the half mirror 56 is made to fall onto a tracking position detector 34, whereby any error in tracking position is detected. This method for detecting errors in tracking position is the same push-pull method as that explained with respect to FIGS. 3 and 4. A tracking position error signal thus obtained is fed back to a lens actuator 7 via a tracking control circuit to drive the lens-moving element 8 in the direction indicated by the arrow 31. Since the objective lens 55 is fixed onto the lens-moving element as described above, the light spot 9 can be positioned at the center of the tracking guide groove by controlling the position of the lens-moving element 8. During this time, the part of the incident beam in the beam splitter 53 is split in the direction of the split-in-two beam sensor 6, and the position of the lens-moving lement 8, i.e. the position of the objective lens 55 in the direction of the arrow 31, in relation to the optical base 5, can be detected by this sensor 6. The motion of the lens-moving element 8 in the focal direction of the arrow 62 has no effect on the detection of the position of the lens, since the split-in-two beam sensor 6 and the beam splitter 53 conduct the same operation. In addition, the optical head 5 shown in FIG. 5 has a simpler construction for the focus actuator and the lens actuator, since the lens-moving element 8 can be moved in both the focal and tracking directions.

What is claimed is:

1. A beam access apparatus for an optical disc system for recording and reproducing information by means of a light beam emitted from a light source located on an optical base in an optical head and condense into a minute light spot on a surface of a disc by an objective lens installed in said optical head, said apparatus comprising:
  (A) means for producing a lens position signal indicating a position of said objective lens in a radial direction of said disc with respect to said optical head;
  (B) means for producing a tracking position error signal indicating an error in the tracking position of said light spot with respect to the track on said disc;
  (C) means for moving said optical head including said objective lens; and
  (D) means for moving said objective lens with respect to said optical head:
    (1) in a head access mode in which said optical head is moved in said radial direction and said objective lens is positioned and fixed at a predetermined position with respect to said optical head in response to said lens position signal; and
    (2) in a lens access mode in which said objective lens is driven in response to said tracking position error signal so that said light spot is positioned on the nearest track.

2. The apparatus of claim 1, wherein said moving means comprises:
  a first feedback circuit for moving said optical head along said radial dircetion as a function of the difference between the present position of said optical head and a desired position of said optical head; and
  a second feedback circuit for moving said objective leans in a manner which maintains said objective lens at said predetermined position with respect to said optical head.

3. The apparatus of claim 2, wherein said first feedback circuit comprises:
  a head position detector for generating a head position signal indicative of the rate of movement of said optical head;
  a reference velocity generator for generating a reference velocity signal indicative of the desired velocity of said optical head;
  a head actuator for moving said optical head as a function of a head head movement signal applied to said actuator; and
  means for generating said head movement signal as a function of said head position and references velocity signals during said head access mode.

4. The apparatus of claim 3, wherein said generating means comprises a differential amplifier.

5. The apparatus of claim 3, where said first feedback circuit further comprises a counter which is loaded with a number indicative of the difference between the initial position of said optical head and the desired position of said optical head at the beginning of said head access mode and is thereafter decremented as a function of said head position signal and wherein said reference velocity generator generates said reference velocity signal as a function of the count in said counter.

6. The apparatus of claim 2, wherein said second feedback circuit comprises:
  a lens actuator for positioning said objective lens in said optical head as a function of said lens position signal; and
  means for applying said lens position signal to said lens actuator when said apparatus is operated in said head access mode of operation.

7. The apparatus of claim 1, wherein moving means causes said objective lens to jump from track to successive track of said disc when said apparatus is operated in said lens access mode.

8. The apparatus of claim 7, wherein said moving means comprises:
  a first feedback circuit for moving said objective lens from track to track in response to a track jump instruction applied thereto when said apparatus is operated in said lens access mode; and
  a second feedback circuit for moving said optical head in a manner which attempts to maintain said optical head at a first fixed position relative to said objective lens when said apparatus is operated in said lens access mode.

9. The apparatus of claim 8, wherein said first feedback circuit comprises:
  a tracking position detector for generating a tracking position signal indicative of the position of said objective lens relative to said tracks;
  a lens actuator for adjusting the position of said objective lens as a function of a control signal applied thereto; and
  a lens access control circuit for generating said control signal as a function of said tracking position signal and in response to said track jump instruction.

10. The apparatus of claim 9, wherein said tracking position signal is an error signal indicative of the distance between said objective lens and a track of said disc.

11. The apparatus of claim 8, wherein said second feedback circuit comprises:
  a head actuator which moves said optical head in response to said lens position signal in a manner which causes the position of said optical head relative to said objective lens to remain substantially constant; and
  means for applying said lens position signal to said head actuator when said apparatus is operated in said lens access mode.

12. The apparatus of claim 1, wherein said optical head is driven in response to said lens position signal in said lens access mode.

13. A beam access apparatus for an optical disc system for recording and reproducing information by means of a light beam emitted from a light source located on an optical base in a optical head and condensed into a minute light spot on a surface of a disc by an objective lens, said apparatus comprising:
  (A) means for producing a lens position signal indicating a position of said objective lens in a radial direction of said disc with respect to said optical head; and
  (B) means for moving said optical head and said objective lens:
    (1) in a head access mode in which said optical head is moved in said radial direction and said objective lens is caused to follow the movement of said optical head such that said objective lens is located at a predetermined position with respect to said optical head; and
    (2) in a lens access mode in which said objective lens is moved in said radial direction and said optical head is caused to follow the movement of said objective lens such that said optical head is located at a predetermined position with respect to said objective lens.

* * * * *